May 6, 1941.　　　J. G. BOTTS　　　2,241,111
WATER POWER MOTOR
Filed May 11, 1939　　　5 Sheets-Sheet 4
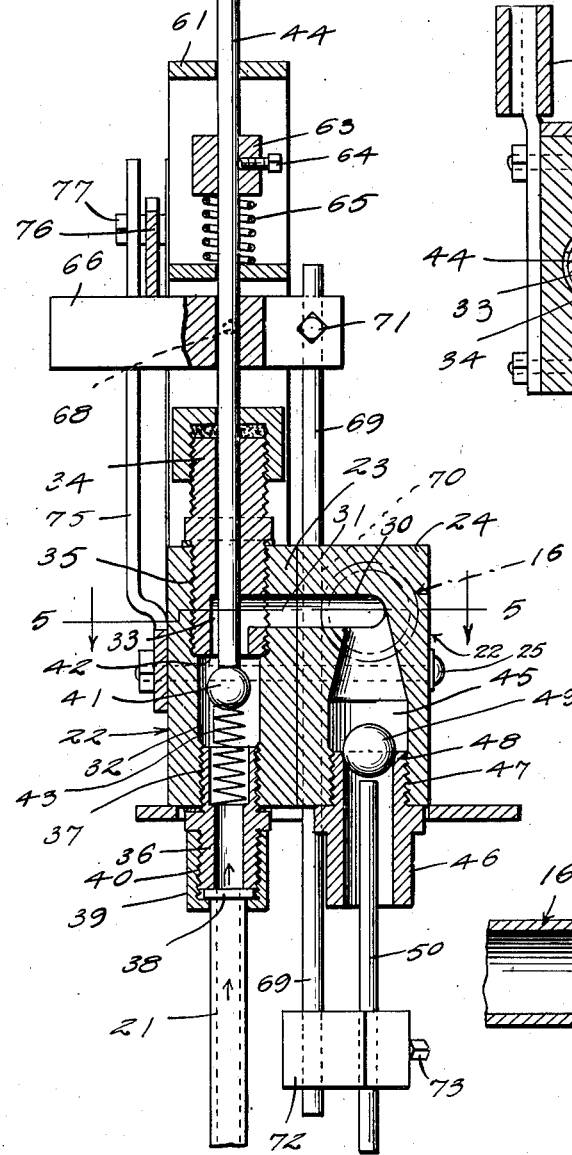
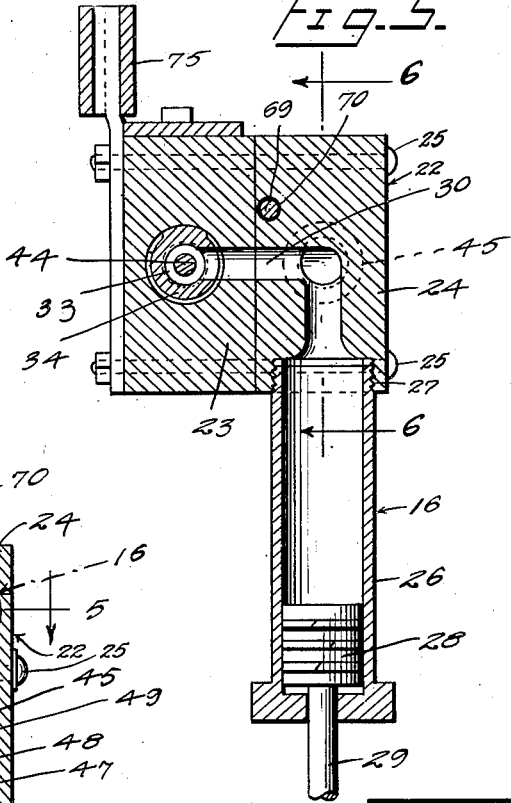
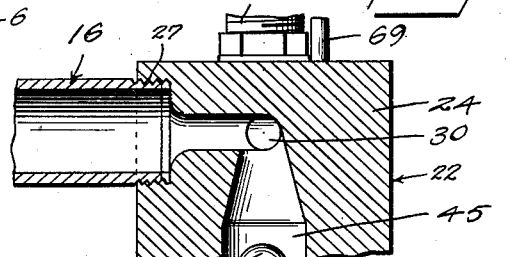
Inventor
J. G. Botts
By L. F. Randolph
Attorney

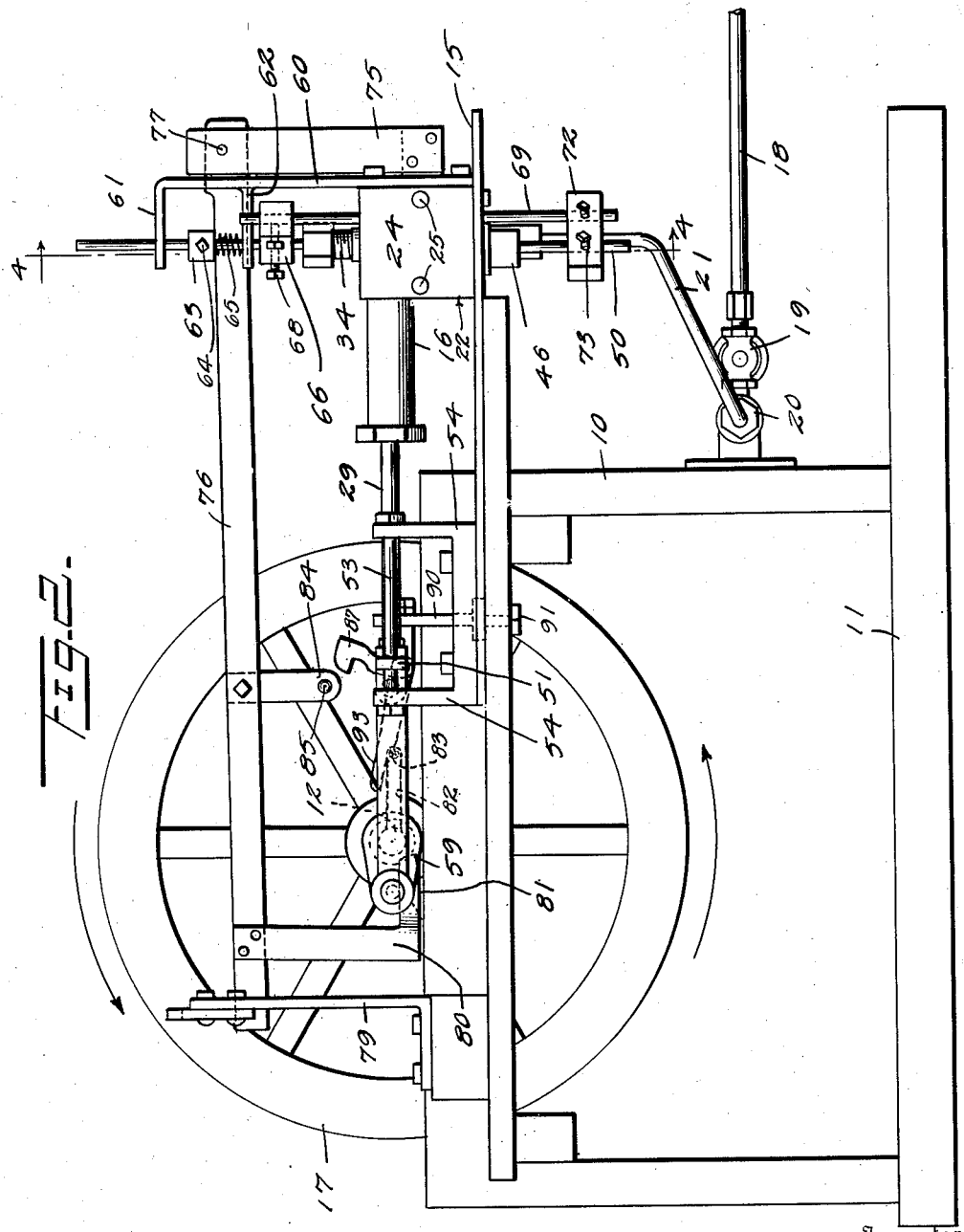

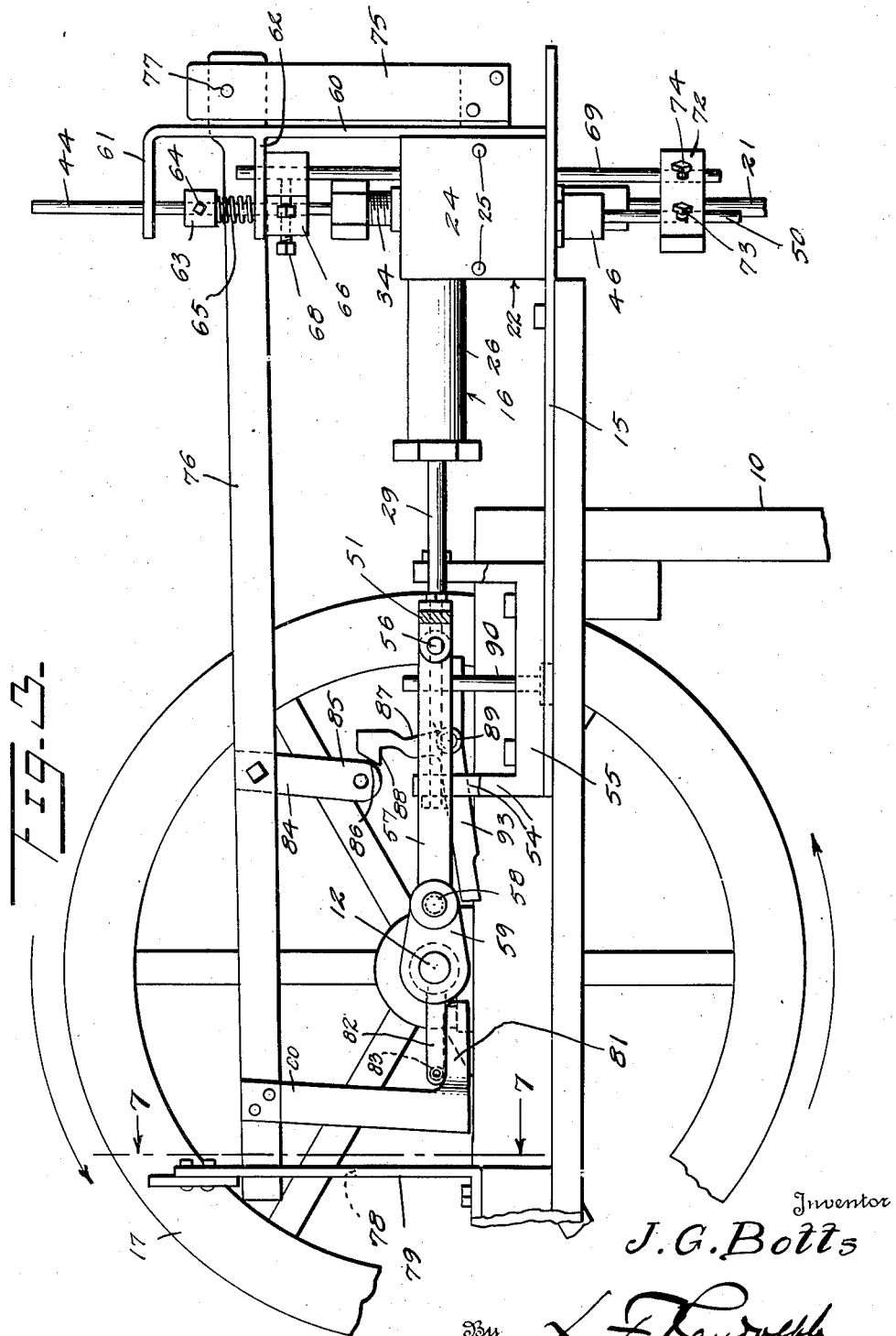

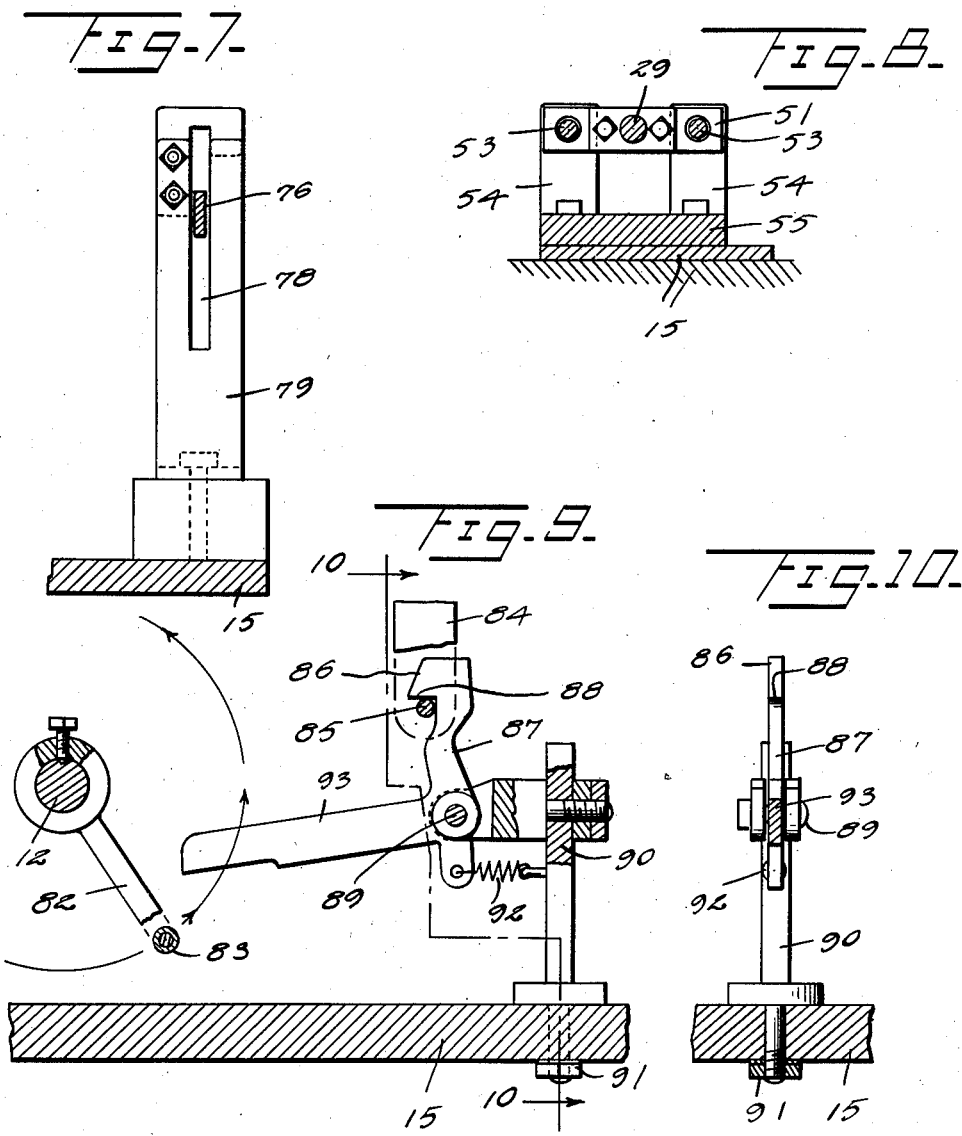

Patented May 6, 1941

2,241,111

UNITED STATES PATENT OFFICE 2,241,111

WATER POWER MOTOR

James G. Botts, Appalachia, Va.

Application May 11, 1939, Serial No. 273,083

3 Claims. (Cl. 121—160)

This invention relates to a motor and it aims to provide a novel construction which is driven by water power.

One object is to provide such an apparatus having hydraulic cylinder mechanisms adapted to apply power impulses one hundred and eighty degrees apart to a driven shaft.

It is also aimed to provide in such a motor, a novel water admission valve structure and control therefor; a construction wherein there is sufficient clearance to enable the fluid pressure to leave the cylinder so as not to interfere with the operation of the piston therein, and to provide means adapted to be held coupled sufficiently long to enable pressure to build up and the means to function as a governor.

The more specific objects and advantages will in part be pointed out and otherwise become apparent from a consideration of the description following taken in connection with accompanying drawings illustrating an operative embodiment.

In said drawings—

Figure 2 is a side elevation of the motor;

Figure 3 is a side elevation, on an enlarged scale, of most of the parts of Figure 2, but showing them in a different position;

Figure 4 is an enlarged vertical sectional view taken substantially on the plane of line 4—4 of Figure 2;

Figure 5 is a horizontal sectional view taken on the plane of line 5—5 of Figure 4;

Figure 6 is a detail sectional view taken on the plane of line 6—6 of Figure 5;

Figure 7 is a detail section taken on the plane of line 7—7 of Figure 3;

Figure 8 is a detail section taken on the plane of line 8—8 of Figure 1;

Figure 9 is a detail section taken on the plane of line 9—9 of Figure 1, and

Figure 10 is a detail section taken on the plane of line 10—10 of Figure 9.

Figure 1:
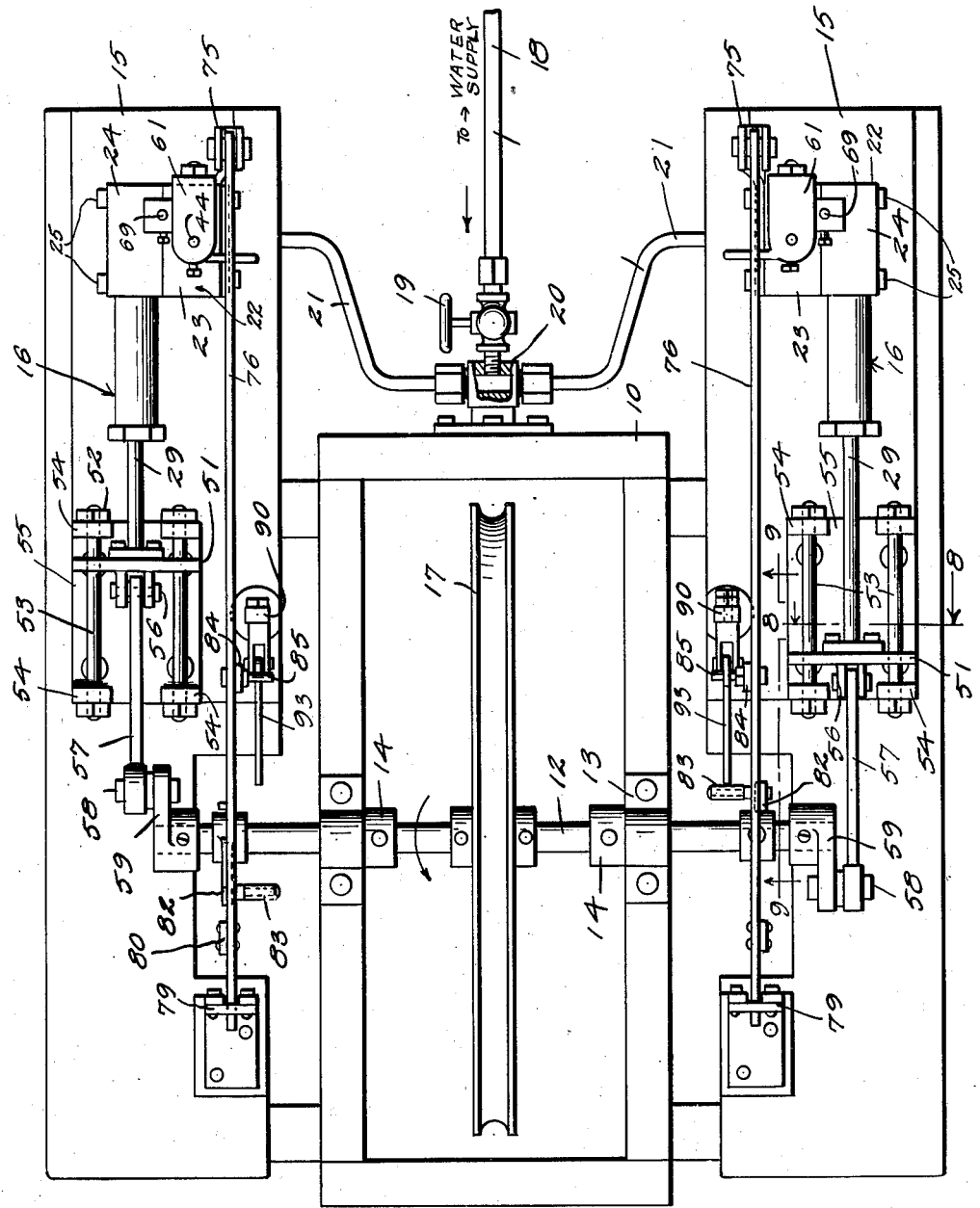
Figure 1 is a plan view of the motor.

Referring specifically to the drawings wherein like reference characters designate like or similar parts, the operating parts of the motor are suitably supported and preferably upon a rigid skeleton framework 10 having a base 11. A driven shaft 12 is journaled in suitable bearings 13 on said framework and is held against longitudinal displacement by means of collars 14 or any equivalent thereof. Framework 10 has similar shelves or supports 15 rigid therewith on opposite sides thereof and each shelf supports a hydraulic cylinder and piston mechanism generally designated 16, adapted to drive or rotate the shaft 12. Power from the shaft 12 may be taken off or transmitted in any suitable manner and for instance by a belt (not shown) trained over a pulley 17 keyed to said shaft 12.

The water or other motive fluid is supplied under the desired pressure through a pipe or conduit 18 controlled by a valve 19. Pipe 18 leads to a fitting 20 which may be secured to the framework 10 and from the fitting branch pipes or conduits 21 lead to a control head 22 rigidly mounted upon the respective shelves 15.

Each control head 22 is preferably made of a plurality of blocks 23 and 24 secured together as by means of bolts 25. Each hydraulic device 16 consists of a cylinder 26 screwed or otherwise fastened as at 27 to the block 24. A piston 28 reciprocates within each cylinder 16 and has a rod 29 extended exteriorly thereof. The block 24 has a passageway 30 therein communicating with the cylinder 26 and communicating with passages 31 and 32 in the block 23 and a passage 33 provided through a stuffing box nipple 34 screwed or otherwise fastened as at 35 in the block 23.

Another nipple 36 is screw threaded as at 37 to the block 23 and has a bore communicating with passage 32 and the bore of the adjacent branch pipe 21, the latter having a flange 38, overlapped by a cap nut 39 screw threaded at 40 to the nipple 36.

A ball valve 41 is located in the passage 32 and urged into engagement with a seat 42 on the nipple 34, by an expansive coil spring 43 positioned by the nipple 36. Said valve 41 is disengaged from its seat 42 and so held at the proper time, through the sliding of a rod 44 against the same.

Exhaust water from the cylinder 16 passes therefrom through a chamber or passage 45 in the block 24, in communication with passage 30 thereof. A nipple 46 is screw threaded as at 47 into passage 45 and its inner end constitutes a valve seat at 48 engageable by a ball valve 49. The latter valve is adapted to be displaced through the raising of a rod 50.

The reciprocating motion of the piston rod 29 is imparted to a crosshead 51 to which the piston rod is fastened. Such crossheads are slidably mounted on guide rods 53, mounted in lugs 54 rising from brackets 55 secured to the shelves 15. Pivotally connected to the crossheads 51 as at 56, are pitmen 57, in turn pivoted at 58 to crank arms 59 rigidly secured to opposite ends of the driven shaft 12. It is to be noted that the cranks 59 are fastened to the shaft one hundred and eighty degrees apart so that one hydraulic cylinder device 16 will drive the shaft 12 while the other is exhausting.

A bracket 60 is fastened to one side of each block 23 and has spaced parallel wings 61 and 62, in which the rod 44 is slidable. An abutment collar or the like 63, is adjustably screwed or otherwise fastened as at 64 on rod 44, between the wings 61 and 62 and an expansive coil spring 65 surrounds such rod, resting on wing 62 and engaging the under surface of collar 63. The spring 65 urges the rod 64 to such an elevation as to free the ball 41 and enable the latter to engage its seat 42.

A block or head 66 is rigidly but adjustably connected to the rod 44 as by means of a screw 68, and is located below the wing 62 and adapted to engage the same to limit the upward movement of rod 44, as shown in Figure 3. A vertically slidable rod 69 has a bearing in a vertical opening 70 in block 24 and it is secured as by means of a screw 71 to the head 66. Below the nipple 46, rod 69 carries a block 72 and block 72 carries the previously mentioned rod 50. Block 72 may be rigidly and adjustably secured to the rods 69 and 50, by means of screws 73 and 74, respectively.

Other brackets 75 rise from the block 23 and long levers 76 are pivoted thereto on horizontal axes at 77 and such levers extend across the adjacent heads 66 so as to engage and depress them at times. At the ends remote to the pivots 77, levers 76 are guided in slots 78 of vertical guide members 79 rising from the respective wings 15. Depending from each lever 76 adjacent the guide members 79, is an arm 80 having a lateral lug 81 at the free end arranged for depression through contact with a crank 82 rigid on the driven shaft 12, such cranks specifically having lateral lugs or rollers 83 which directly engage the lugs 81.

Said levers 76 at a point intermediate the pivots 77 and arms 80, have dependents 84 having lateral lugs 85 which are engageable against beveled surfaces 86 of latch levers 87 in order to displace such latch levers and then snap under hooks 88 thereof. Such latch levers 87 are pivoted as at 89 to suitable mountings 90 rigidly bolted as at 91 to the adjacent wing 15, and which mountings include contractile springs 92, connected thereto and to the levers 87, urging such levers into the lug-engaging position of Figure 9. Such latch levers 87 also include trip arms 93, the latter being disposed in the path of upward movement of the lugs 83, as shown in Figure 9, so that the latches may be tripped or rocked to disengage lugs 85 and enable the levers 76 to swing upwardly on their pivots 77, because heads 66 are in contact with such levers and the rods 44 and heads 66 are subject to the expansive action of the springs 65.

In the operation of the motor, with the parts in the position of Figure 3, and water being supplied through the pipes 18 and 21, the valve 41 will be lowered through the depression of rod 44 and the water under pressure will enter the adjacent cylinder 26 because the lever 76 will be lowered through the contact of lug 82 with the lug 81, thereby depressing the head 66 with which the rod 44 is rigid, the valve 49 being seated during this operation. Continued downward movement of lever 76 causes lug 85 to displace the latch 87 and then snap into engagement therewith. Such latch through said engagement holds the valve 41 open, long enough to enable pressure to build up in the cylinder 16. The holding of such valve 41 open is for a short period of time since the continued rotation of driven shaft 12 moves lug 83 into engagement with the trip arm 93 of latch lever 87, thereby rocking such lever against the tension of spring 92 and releasing the lug 85, so that the lever returns to normal or uppermost position under urgency of the spring 65. At the proper sequence of operation, the rod 50 is raised, contacting ball 49, displacing it from its seat so that the water may escape or exhaust from the adjacent cylinder through the nipple 46.

It will be realized that the hydraulic devices on opposite sides of the apparatus, operate in timed sequence one hundred and eighty degrees apart so that the maximum power derived will be applied to the driven shaft 12.

Various changes may be resorted to provided they fall within the spirit and scope of the invention.

I claim as my invention:

1. Apparatus of the class described having a cylinder, a piston operable therein, a control head for the cylinder having inlet and exhaust valves constructed and arranged to open in opposite directions, means normally urging the inlet valve to closed position, a rod movable against said inlet valve to open it, spring means urging movement of the rod away from the inlet valve, an abutment on the rod, a shaft driven through the reciprocation of said piston, a lever, crank means on said shaft engageable with the lever to move said rod to open the inlet valve and to compress said spring, latch means to temporarily hold the lever in inlet valve opening position engageable with the lever automatically through depression thereof, said crank means also being operable against the lever to release the latch means so that the compressed spring means will move the lever and rod to inlet valve closing position, and means operable through the movement of said rod after closing of the inlet valve to open the exhaust valve.

2. Apparatus of the class described having a cylinder, a piston operable therein, a control head for the cylinder having inlet and exhaust valves, a lever, a shaft driven through the reciprocation of said piston, crank means operable by the shaft to actuate the lever, means to open said valves in sequence through the movement of said lever, and latch means to temporarily hold the lever in inlet valve opening position engageable with the lever through movement thereof in one direction and disengageable from the lever by said crank means.

3. Apparatus of the class described having a cylinder, a piston operable therein, a control head for the cylinder having inlet and exhaust valves constructed and arranged to open in opposite directions, means normally urging the inlet valve to closed position, a rod movable against said inlet valve to open it, spring means urging movement of the rod away from the inlet valve, an abutment on the rod, a shaft driven through the reciprocation of said piston, a lever, crank means on said shaft engageable with the lever to move said rod to open the inlet valve and to compress said spring, latch means to temporarily hold the lever in inlet valve opening position engageable with the lever automatically through depression thereof, said crank means also being operable against the lever to release the latch means so that the compressed spring means will move the lever and rod to inlet valve closing position, means operable through the movement of said rod after closing of the inlet valve to open the exhaust valve, said latch means being in the path of movement of said crank means for contact by the latter to disengage the latch means from said lever.

JAMES G. BOTTS.